United States Patent [19]

Sattler et al.

[11] Patent Number: 5,137,346
[45] Date of Patent: Aug. 11, 1992

[54] MOTION PICTURE CAMERA WITH ADJUSTABLE ROTARY SHUTTER

[75] Inventors: Fritz Sattler, Munich; Anh Nguyen-Nhu, Unterschleissheim, both of Fed. Rep. of Germany

[73] Assignee: Arnold & Richter Cine Technik GmbH & Co. Betriebs KG, Munich, Fed. Rep. of Germany

[21] Appl. No.: 736,450

[22] Filed: Jul. 26, 1991

Related U.S. Application Data

[63] Continuation at PCT DE90/00044, Jan. 22, 1990

[30] Foreign Application Priority Data

Jan. 30, 1989 [DE] Fed. Rep. of Germany ....... 3902688

[51] Int. Cl.[5] .................................................. G03B 9/10
[52] U.S. Cl. ..................................... 352/216; 352/214; 352/217
[58] Field of Search ......................... 352/214, 216, 217

[56] References Cited

U.S. PATENT DOCUMENTS 4,322,140 3/1982 Takimoto et al. .................. 352/91 C
4,576,456 3/1986 Okino et al. ........................ 352/216

FOREIGN PATENT DOCUMENTS 2947333 6/1981 Fed. Rep. of Germany .
60-70427 4/1985 Japan .

Primary Examiner—Monroe H. Hayes
Attorney, Agent, or Firm—Nils H. Ljungman & Associates

[57] ABSTRACT

In the disclosed moving picture camera with an adjustable rotary shutter, the shutter has a rotary shutter and an adjusting blade. The shutter adjusting blade is adjustable coaxially to the rotary shutter, which adjusts a shutter aperture angle. A transmission and a positioning motor adjust the adjusting blade relative to the rotary shutter. A potentiometer is connected to the shutter adjusting blade and to the rotary shutter, for measuring the position of the shutter adjustment blade in relation to the rotary shutter. The potentiometer generates a position signal indicating the actual position of the shutter adjustment blade in relation to the rotary shutter.

20 Claims, 4 Drawing Sheets

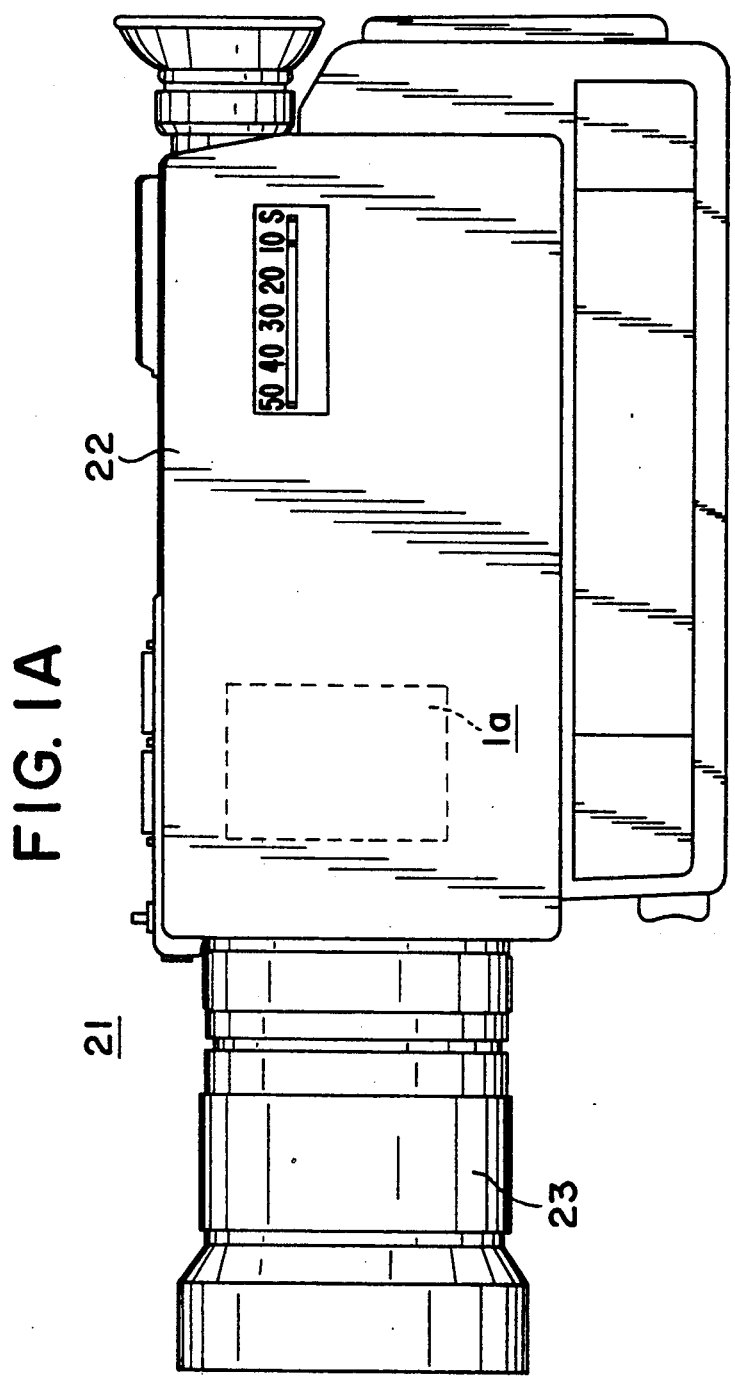

MOTION PICTURE CAMERA WITH ADJUSTABLE ROTARY SHUTTER

CROSS REFERENCE TO RELATED APPLICATIONS

This application is a continuation application of International Application No. PCT/DE90/00044 filed on Jan. 22, 1990 in which the U.S. was a designated country, which claims priority from Federal Republic of Germany Patent Application No. P 39 02 688.4 filed on Jan. 30, 1989.

BACKGROUND OF THE INVENTION

1. Field of the Invention

This invention relates to a moving picture camera with an adjustable rotary shutter. The adjustable rotary shutter having a rotary shutter and a shutter adjusting blade which adjusting blade can be adjusted coaxially to the rotary shutter, and which adjusting blade is connected by means of a transmission with a positioning motor coupled to the shaft of the rotary shutter, and to an arrangement for the operation of such an adjustable rotary shutter.

2. Background Information

Federal Republic of Germany laid open Patent Application Number DE-OS 29 47 333 discloses an adjustable rotary shutter for a moving picture camera of the type described above, which has a shutter adjusting sector oriented coaxially on the rotation shaft of the rotary shutter. The shutter adjusting sector can be adjusted by means of an adjusting shaft mounted so that it can rotate in the rotation shaft of the rotary shutter. One end of the adjusting shaft is connected to a positioning motor placed on the rotation shaft of the rotary shutter, while the other end has a pinion which is connected via a transmission to the shutter adjusting sector.

The adjustable rotary shutter of the prior art makes possible a continuous adjustment of the aperture when the rotary shutter is in motion, by feeding the positioning motor with a voltage whose polarity specifies the direction of the adjustment. The fact that the rotary shutter can be adjusted during movement guarantees that the aperture of the shutter rotates synchronously and in correct phase with the film transport mechanism, covers the image area during the film transport phase, and is not smaller than the operating angle which the corresponding film feed mechanism allows. Then the exposure of the moving picture image takes place when the film is standing still in the vicinity of the remaining shutter bright sector, so that a reduction of this bright sector reduces the exposure time available, while an enlargement of the bright sector provides a longer exposure time. With a continuously adjustable rotary shutter, therefore, the exposure time based on a specified exposure program or other parameters can be adjusted to the current lighting conditions or the desired effects.

The current shutter adjusting sector is measured in the adjustable rotary shutter of the prior art by means of an electro-optical scanning device and an electronic control system, and consists of a luminous source located in the movement path of the adjustable rotary shutter and an opto-receiver, which together form a photoelectric barrier for the determination of the actual opening times of the adjustable rotary shutter. By means of a digital circuit, the light pulses emitted by the photoelectric barrier are counted, and the position of the shutter adjusting sector or the value of the aperture is determined from the count. For this reason, the measurement of the shutter adjusting sector is possible only when the adjustable rotary shutter is in motion. To maintain the desired shutter adjusting sector, it is also necessary to constantly readjust the positioning motor, to maintain the desired and specified shutter adjusting sector.

U.S. Pat. No. 4,322,140 discloses an adjustable rotary shutter for moving picture cameras which consists of several shutter blades which can be moved in relation to one another, and which are located on a shutter shaft, which is connected by means of a transmission to a film transport motor. A hollow shutter shaft sleeved over on the shutter shaft is connected by means of an adjusting cylinder to a positioning motor, which rotates the shutter blades in relation to one another. The hollow shutter shaft has a pin engaged in a hole of the one external shutter blade, while the other external shutter blade has a hole into which a pin of the transmission connected to the film transport motor is engaged. The shutter blades have radial grooves which extend over a specified angle, so that the individual shutter blades can be adjusted in relation to one another over a specified total angle.

The position of the adjusting cylinder and thus of the shutter blades in relation to one another is detected by means of several switches which are arranged on the periphery of the adjustment cylinder and are engaged with cams located on the adjustment cylinder. Thus, as a whole, the shutter aperture angle can be detected when the moving picture camera is in operation, but when the camera is not operating, measurement is possible only within a broad tolerance range.

OBJECT OF THE INVENTION

The object of the present invention is to create an adjustable rotary shutter of the type described above, in which the shutter adjusting sector can be adjusted both when the camera is operating and when it is stopped, and can be displayed on a display apparatus, and which allows a manual adjustment of the shutter adjusting sector, with a simultaneous measurement and display of the value set when the adjustable rotary shutter is at rest.

SUMMARY OF THE INVENTION

This object is achieved by means of the rotary shutter for a moving picture camera having a potentiometer connected on one hand to the shutter adjusting blade and on the other hand to the rotary shutter. The potentiometer measures the current position of the shutter adjustment blade in relation to the rotary shutter and emits a position signal indicating the current position. The position signal functions as a control signal for the activation of a display apparatus indicating the shutter aperture angle, and the position signal acts as the measured value to a controller, which compares this measured value to a setpoint indicated by a setpoint device, and transmits an activation signal to the positioning motor.

The solution according to the invention makes it possible, both when the rotary shutter is in motion and when the adjustable rotary shutter is at rest, to define the current adjustment angle of the shutter adjusting blades. It is also possible to manually set the desired shutter adjusting sector when the adjustable rotary shutter is at rest, and to read the value set, or have it displayed by means of an electronic control apparatus. On account of the capability of detecting the shutter adjusting sector both when the shutter is in motion and at a standstill, it is possible that a value, once set, can be measured and reproduced by a suitable control apparatus after a manual adjustment, e.g. for cleaning the adjustable rotary shutter.

An advantageous refinement of the solution according to the invention is characterized by the fact that there is a manual adjustment apparatus for the off-current adjustment of the shutter adjusting blade, which has a rotary disc connected to the rotary shutter with several notches on the circumference, and a locking lever connected to the shutter adjusting blade for a positive connection between the shutter adjusting blade and the rotary shutter.

This refinement of the solution according to the invention makes possible a manual adjustment for an off-current adjustment of the adjustable rotary shutter, whereby the angle set for the shutter adjusting blades can be mechanically stopped, so that even if there is a power failure or a failure of the positioning motor, it is possible to set the desired shutter adjusting sector.

One advantageous configuration of the solution according to the invention is characterized by the fact that between the rotary shutter and the shutter adjusting blade, there is a bearing and friction device, which consists of several spheres located at some radial distance from one another and several plastic segments located in the radial direction between the spheres, with several magnets fastened to the shutter adjusting blades.

This configuration of the solution according to the invention guarantees that the shutter adjusting sector is not adjusted in normal operation, and eliminates the need for a constant readjustment by means of the positioning motor. The mounting, according to the invention, of the adjusting blades with additional friction, means that the currently set position of the shutter adjustment blades is retained even when the rotary shutter is rotating, and only a slight readjustment is necessary, e.g. when there is a change in the film speed or a deliberate adjustment of the shutter adjusting sector.

One arrangement for the operation of the adjustable rotary shutter is characterized by the fact that there is a sensor apparatus located in the vicinity of the rotary shutter, which is connected to a microprocessor, by the fact that the microprocessor is also connected on the output side by means of a first amplifier to two slip ring contacts connected to the positioning motor and on the input side by means of a second amplifier to three slip ring contacts connected to the potentiometer and a setpoint device.

With this arrangement for the operation of the adjustable rotary shutter, the sensor apparatus, when the adjustable rotary shutter is in motion, measures the current shutter opening angle, i.e. the opening time of the rotary shutter, which is compared to the specified aperture, so that a correction can be made by means of the control and regulation apparatus.

The precision of the shutter aperture is thereby guaranteed, independently of system tolerances.

In one advantageous refinement of this arrangement, the sensor apparatus consists of a photoelectric barrier, which measures the opening time or closing time and sends a corresponding digital signal to a microprocessor. This microprocessor compares the measured value of the shutter opening time to an analog or digital setting, whereby the analog setting is input by means of an analog/digital converter, while the digital setting is part of a digital sequential program.

One aspect of the invention is a moving picture camera with an adjustable rotary shutter, said camera comprising: a camera body; a lens; a rotary shutter on a shaft; a shutter adjusting blade, said shutter adjusting blade being adjustable coaxially to said rotary shutter for adjusting a shutter aperture angle; a transmission and a positioning motor, said adjusting blade being connected by said transmission with said positioning motor coupled to said shaft of said rotary shutter; a potentiometer being connected to said shutter adjusting blade and to said rotary shutter, said potentiometer for measuring the actual position of said shutter adjustment blade in relation to said rotary shutter, and said potentiometer for generating a position signal indicating the actual position; a setpoint device for indicating a setpoint of the adjustable rotary shutter; said position signal being for at least one of: a) a control signal for the activation of a display apparatus for indicating the shutter aperture angle, and b) a measured value for a controller, said controller for comparing said measured value to said setpoint to generate an error signal, and said controller for transmitting an activation signal derived from said error signal to said positioning motor.

An additional aspect of the invention is a moving picture camera with an adjustable rotary shutter, the moving picture camera comprising: a camera body; a lens; a rotary shutter; a shutter adjusting blade being adjustable in relation to the rotary shutter, the shutter adjusting blade being connected by means of a transmission to a positioning motor coupled to the shaft of the rotary shutter; a first plurality of slip ring contacts being connected to the positioning motor; a potentiometer being connected to said shutter adjusting blade and said rotary shutter, said potentiometer comprising a wiper strip, said potentiometer for measuring the actual position of said shutter adjustment blade in relation to said rotary shutter; a second plurality of slip ring contacts being connected to said wiper strip of said potentiometer; a sensor apparatus being in the vicinity of the rotary shutter, said sensor apparatus for measuring a shutter aperture angle; a microprocessor comprising at least one input and at least one output, said microprocessor for being connected to said sensor apparatus; a first amplifier and a second amplifier; said microprocessor being connected on one of said at least one output via said first amplifier to the first plurality of slip ring contacts; said microprocessor being connected on one of said at least one input via said second amplifier to the second plurality of slip ring contacts; and a setpoint device being connected to one of said at least one input of said microprocessor, said setpoint device for indicating a setpoint of the adjustable rotary shutter.

BRIEF DESCRIPTION OF THE DRAWINGS

The invention is explained in greater detail below, with reference to the embodiments illustrated in the accompanying drawings.

FIG. 1A shows a motion picture camera with an adjustable rotary shutter;

DESCRIPTION OF THE PREFERRED EMBODIMENTS

FIG. 1A is a moving picture camera 21 having a body 22, a lens 23, and an adjustable rotary shutter 1a.

Figure 1:
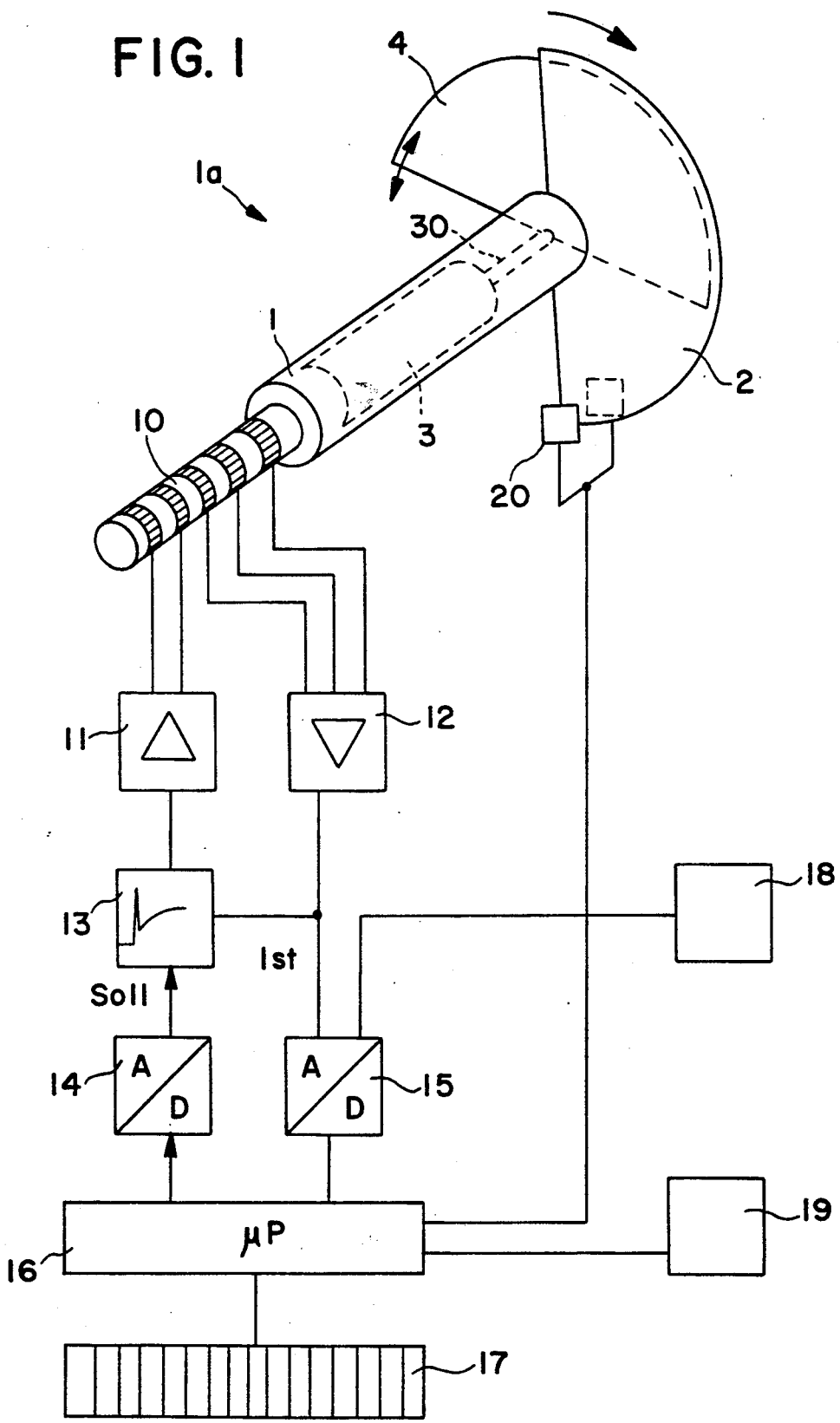
FIG. 1 shows a schematic perspective drawing of an adjustable rotary shutter with the corresponding control system.

FIG. 1 is a schematic perspective illustration of the adjustable rotary shutter 1a, which consists of a one-piece rotary reflecting shutter 2, which is permanently connected to the rotary shutter shaft 1, and an adjustable shutter adjusting blade 4, which is coupled by means of an adjusting shaft 30 to a positioning motor 3 connected to the rotary shutter shaft 1. The rotary shutter shaft 1 has five slip ring contacts 10, which are used to transmit the power supply to the positioning motor 3 and to transmit a measurement indicating the position of the shutter adjusting blade 4 in relation to the rotary shutter 2.

To adjust the shutter aperture or the shutter adjusting sector of the moving picture camera, the positioning motor 3 must produce a relative motion between the rotary shutter 2 and the shutter adjusting blade 4. This movement is produced because the positioning motor 3 is fed via the slip ring contacts 10 with a corresponding voltage which drives it, and the polarity of the voltage feed determines the direction of the adjustment of the shutter adjusting blades toward a larger or smaller shutter aperture.

Two of the five slip ring contacts are connected to the positioning motor 3, and to the output of a first amplifier 11, whose input is connected via a proportional-integral-derivative (PID) controller 13 and a digital-/analog converter 14 to a microprocessor 16.

The three remaining slip ring contacts 10 are connected on the one hand to a measurement device to measure the shutter aperture angle, and on the other hand to the input of a second amplifier 12, whose output is connected both to an analog/digital converter 15 and to the PID controller 13.

An analog/digital converter 15 is connected to an analog operating device 18. The output of the analog/digital converter 15 is connected to an input of the microprocessor 16, which microprocessor 16 is connected via additional inputs to a programmer unit 19 and to a photoelectric barrier 20, which is located in the vicinity of the adjustable rotary shutter 2, 4.

An additional output of the microprocessor 16 is connected to a display apparatus 17.

To adjust the shutter aperture of the moving picture camera, a corresponding value is set on the analog operating apparatus 18, or is specified by the programmer unit 19, which for example can specify a change in the shutter aperture, as a function of the transport speed of the moving picture camera in the form of a ramp-like adjustment curve.

The specified setpoint is transmitted via the digital-/analog converter 14 and the PID controller 13, and via the first amplifier 11, to the slip ring contacts 10 connected to the positioning motor 3, so that a corresponding change in the voltage feed to the positioning motor 3 produces a relative movement of the shutter adjusting blade 4 in relation to the rotary shutter 2. As a function of the value set, the positioning motor 3 executes a movement relative to the rotating rotary shutter shaft 1, and thereby moves the shutter adjusting blade 4 toward a larger or smaller sector, and thus toward a larger or smaller shutter aperture.

A measurement device coupled to the rotary shutter 2 and the shutter adjusting blade 4 emits a signal corresponding to the current position of the shutter adjusting blade 4 in relation to the rotary shutter 2, by means of three of the five slip ring contacts 10, to the second amplifier 12, and via the analog/digital converter 15 to an input of the microprocessor 16, which on one hand displays the current angular position of the shutter adjusting blade 4 on the display apparatus 17, and on the other hand performs a setpoint/measurement comparison on the basis of the setpoint emitted by the analog operating device 18 or the programmer unit 19.

The additional arrangement of a photoelectric barrier 20 in the vicinity of the rotary shutter 2 produces a measurement of the opening time of the rotary shutter 2 during its movement, by means of the microprocessor 16 and an additional setpoint/measurement comparison, so that a precision correction is made, which means that the precision of the shutter adjustment is guaranteed independently of any system tolerances.

The adjustment of the shutter aperture of the moving picture camera can optionally be made manually, automatically, e.g. in connection with an exposure meter, or it can be programmed according to a specified sequential program. In this manner it is possible to adjust the shutter aperture to the current light conditions, to achieve certain desired effects, or to adjust the shutter aperture, and thus the exposure time of the moving picture film, to the current film speed.

Figure 2:
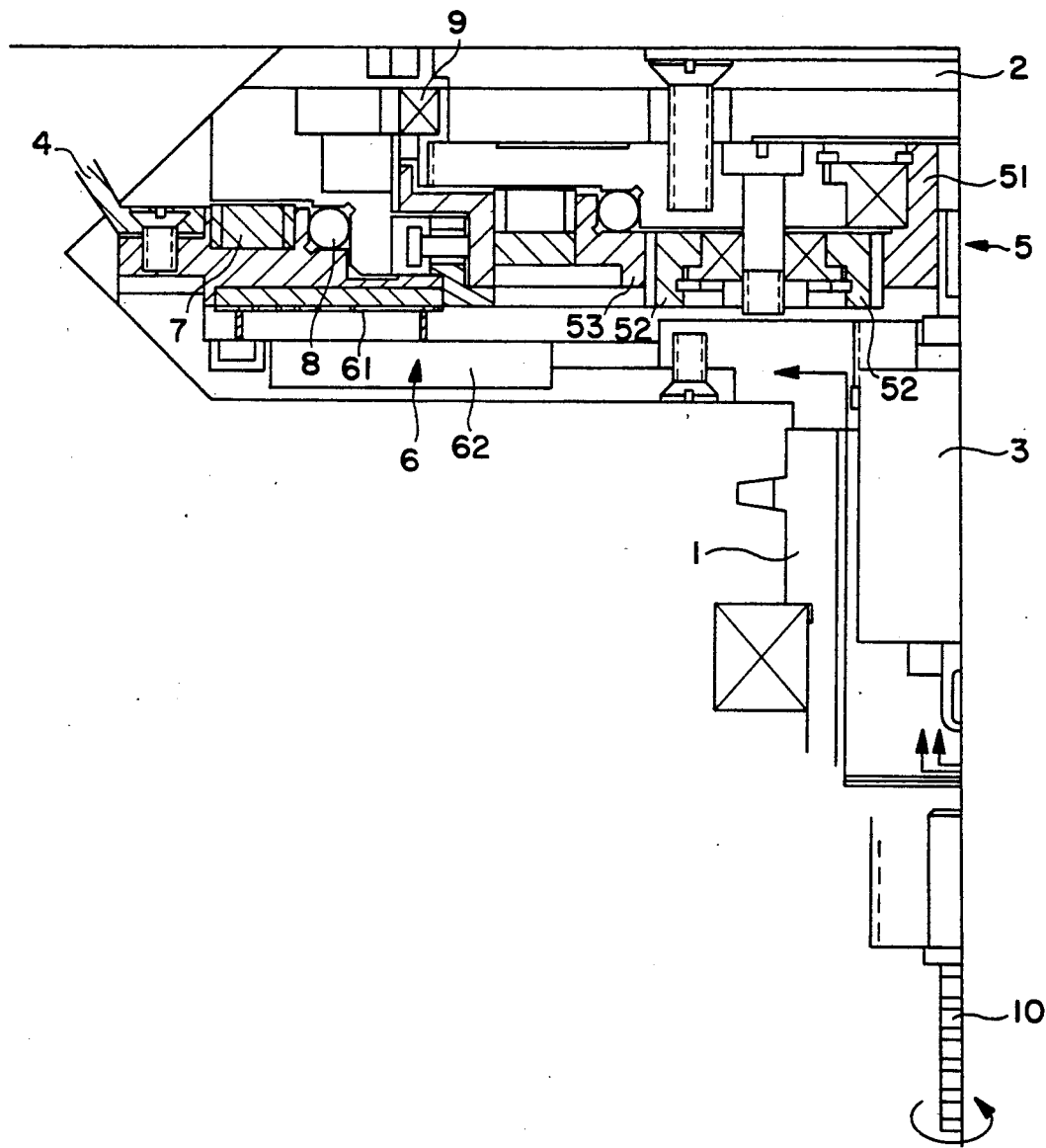
FIG. 2 shows a cross section through the adjustable rotary shutter.

FIG. 2 shows a cross section through the adjustable rotary shutter as well as the rotary shutter shaft. In the present embodiment, the rotary shutter shaft is driven by the main motor of the moving picture camera in a manner not described in any further detail, but it can optionally be equipped with its own drive motor, which is coupled electronically to the main motor of the moving picture camera.

The rotary shutter shaft 1 is rigidly coupled to the rotary shutter 2, which is preferably a one-piece reflecting shutter, which is fastened directly onto the shaft flange. Inside the rotary shutter shaft 1 there is a positioning motor 3 which is mechanically coupled to a planetary gearing 5, and whose power supply is received via slip ring contacts 10 located on the end of the rotary shutter shaft 1.

Figure 3:
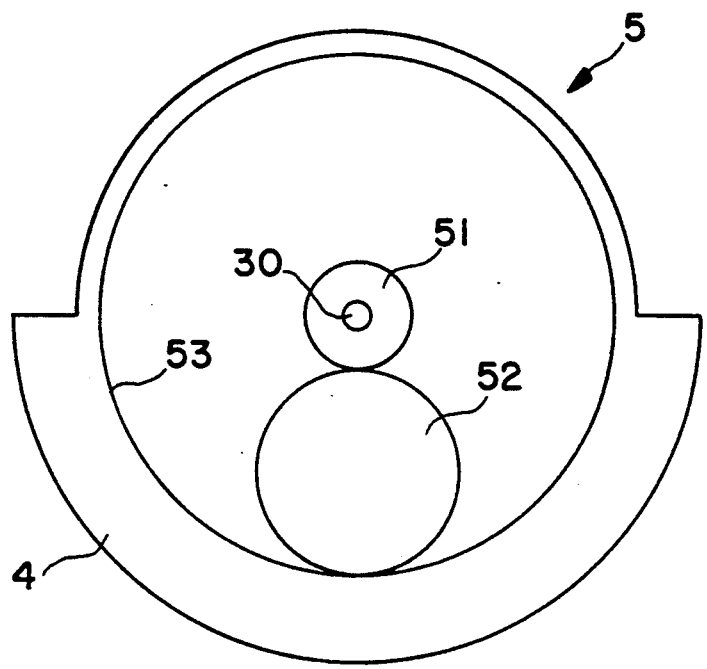
FIG. 3 shows a cross section through the planetary gearing for adjustment of the shutter adjusting blades.

As shown by the cross section in FIG. 3 through the planetary gearing 5, the adjustment shaft 30 of the positioning motor 3 is connected to the sun wheel 51 of the planetary gearing 5, whose at least one planet wheel 52 is stationary. The shutter adjusting blade 4 is connected to the ring gear 53 of the planetary gearing 5, and is mounted in relation to the rotary shutter 2 by means of a bearing and friction apparatus 7, 8 described below in further detail.

A wiper track 62 of the potentiometer 6 permanently connected to the rotary shutter shaft 1, in connection with wiper contacts 61 which are connected permanently to the shutter adjusting blade 4, is used as a measurement device to measure the position of the shutter adjusting blade 4 in relation to the rotary shutter 2. As a function of the position of the shutter adjusting blade 4 in relation to the rotary shutter 2, the resistance value of the potentiometer 6 changes, so that the current position of the shutter adjusting blade 4 can be measured by means of the resistance value of the potentiometer 6.

For this purpose, the potentiometer 6 is connected by means of a corresponding line to the slip ring contacts 10 and transmits a signal corresponding to the position of the shutter adjusting blade 4 via the slip ring contacts 10 to the microprocessor, as shown in FIG. 1.

A manual adjustment apparatus 9 is used for the off-current adjustment of the adjustable rotary shutter when the rotary shutter 2 is at rest, and the manual adjustment apparatus 9 contains a rotary disc coupled to the rotary shutter 2 with several grooves or notches located on its circumference, and a locking lever or ratchet connected to the shutter adjusting blade 4 for a positive engagement in the grooves or notches of the rotary shutter. In this manner, when the adjustable rotary shutter is at rest, a desired angular aperture of the shutter adjusting blade can be set and mechanically stopped. The manual adjustment apparatus is used essentially to maintain a shutter aperture if the power fails or if the positioning motor fails.

On account of the measurement apparatus according to the invention, the manually set value of the shutter aperture can be read on the display apparatus 17 shown in FIG. 1, so that the current aperture angle can always be read, either in motion or at rest.

An additional essential advantage of the measurement apparatus according to the invention is that a shutter aperture angle set manually or by means of the positioning motor 3 can be memorized by the microprocessor 16 in a memory and then reset by calling up the stored value. This feature guarantees that a value of the shutter aperture angle can be reset, e.g. after an adjustment to clean the rotary reflecting shutter.

In a similar fashion, it is possible to store and then retrieve different shutter aperture angles, either as a function of the transport speed of the moving picture film or independently of it.

The coupling of the shutter adjusting blade 4 to the rotary shutter 2 is made by means of a bearing and friction apparatus 7, 8, which is designed so that in normal operation, as a result of the friction between the shutter adjusting blade 4 and the rotary shutter 2, it is not necessary to constantly readjust the positioning motor 3 to maintain a specified shutter aperture angle.

Figure 4:
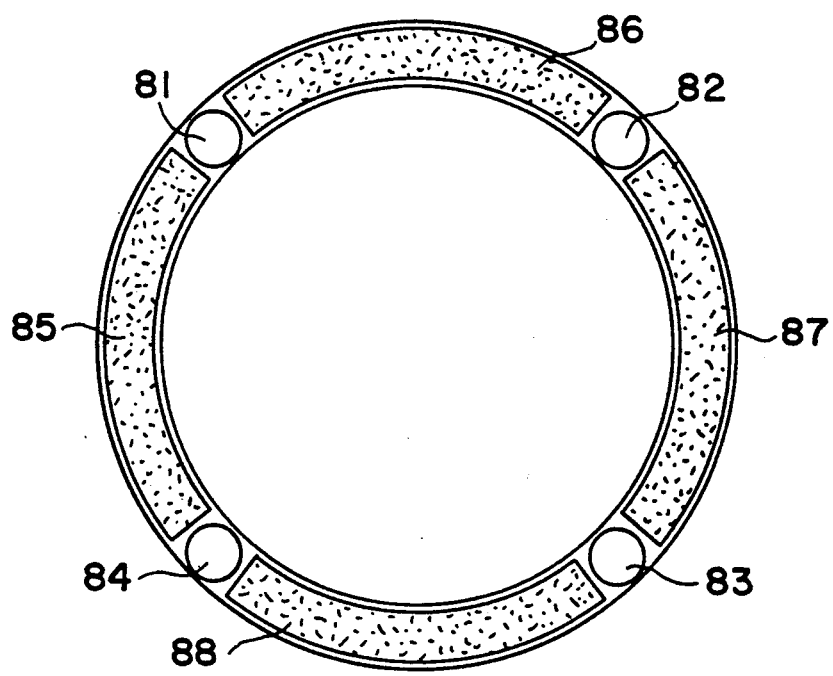
FIG. 4 shows a cross section through the bearing and friction apparatus of the shutter adjustment blades.

As shown in FIG. 4, this feature is achieved by means of a mounting which is provided by several spheres 81 to 84 distributed over the circumference of the bearing, and plastic segments 85 to 88 located between them, in connection with several magnets 7 distributed on the shutter adjusting blade 4, as shown in FIG. 2.

With this type of mounting, the spheres 81 to 84 of the bearing are used for the precise radial guidance of the shutter adjusting blade 4, while the plastic segments provided between the spheres 81 to 84 guarantee the axial guidance of the shutter adjusting blade 4, compensate for the play caused by the positioning motor 3, the transmission etc., and prevent axial movements of the shutter adjusting blade 4.

In connection with the magnets 7 distributed over the shutter adjusting blade 4, a magnetic adherence force is achieved which generates a specified friction, so that in normal operation, a shutter aperture angle set by means of the positioning motor 3 can be maintained without readjustment.

An adjustment of the shutter adjustment angle or shutter adjusting blade 4 in relation to the rotary shutter 2 must therefore be made by overcoming the friction force which is caused by the magnets 7 and the plastic segments 85 to 88.

The adjustable rotary shutter described above therefore makes possible a more reliable and precise operation for the automatic, programmed or manual adjustment of a shutter adjusting blade in relation to the rotary shutter for a change of the shutter aperture angle with a precise indication of the shutter aperture angle set.

The presence of a manual adjustment apparatus guarantees that any desired shutter aperture angle can be set, even in the event of a failure of the positioning motor or of the power supply.

The presence of a friction apparatus means that to maintain a specified shutter aperture angle, it is not necessary to constantly readjust the position of the shutter adjusting blade in relation to the rotary shutter, which would require a significant current consumption to activate the positioning motor. Likewise, an extremely precise positioning of the shutter adjusting blade is guaranteed in relation to the rotary shutter, as a result of the corresponding arrangement of the spheres of the bearing apparatus.

One aspect of the invention is an adjustable rotary shutter for a moving picture camera with a rotary shutter and a shutter adjusting blade which can be adjusted coaxially to it, and which is connected by means of a transmission with a positioning motor coupled to the shaft of the rotary shutter, characterized by the fact that a potentiometer 6 connected on one hand to the shutter adjusting blade 4 and on the other hand to the rotary shutter 2 measures the current position of the shutter adjustment blade 4 in relation to the rotary shutter 2, and emits a position signal indicating the current position as a control signal for the activation of a display apparatus 17 indicating the shutter aperture angle, and/or as the measured value to a controller 13, which compares this measured value to a setpoint indicated by a setpoint device 18, 19, and transmits an activation signal to the positioning motor 3.

Another aspect of the invention is an adjustable rotary shutter characterized by the fact that the wiper strip 62 of the potentiometer 6 is connected to the shaft 1 of the rotary shutter 2 and the wiper contact 61 of the potentiometer 6 is connected to the shutter adjusting blade 4.

Yet another aspect of the invention is an adjustable rotary shutter characterized by the fact that the rotary shutter shaft 1 has slip ring contacts 10 for the current feed for the positioning motor 3 and for the transmission of the potentiometer resistance value.

A further aspect of the invention is an adjustable rotary shutter for a moving picture camera with a rotary shutter and a shutter adjusting blade which can be adjusted coaxially to it, and which is connected by means of a transmission with a positioning motor coupled to the shaft of the rotary shutter, with a potentiometer 6 connected on one hand to the shutter adjusting blade 4 and on the other hand to the rotary shutter 2 which measures the current position of the shutter adjustment blade 4 in relation to the rotary shutter 2, and emits a position signal indicating the current position as a control signal for the activation of a display apparatus 17 indicating the shutter aperture angle, and/or as the measured value to a controller 13, which compares this measured value with a setpoint indicated by a setpoint device 18, 19, and transmits an activation signal to the positioning motor 3, whereby the transmission consists of a planetary gearing 5, whose sun wheel 51 is connected to the shaft of the positioning motor 3, whose planet wheel 52 or wheels are stationary, and whose gear rim 53 is coupled to the shutter adjusting blade 4.

Yet another further aspect of the invention is a adjustable rotary shutter for a moving picture camera with a rotary shutter and a shutter adjusting blade which can be adjusted coaxially to it, and which is connected by means of a transmission to a positioning motor coupled to the shaft of the rotary shutter, with a potentiometer 6 connected on one hand to the shutter adjusting blade 4 and on the other hand to the rotary shutter 2 which measures the current position of the shutter adjustment blade 4 in relation to the rotary shutter 2, and emits a position signal indicating the current position as a control signal for the activation of a display apparatus 17 indicating the shutter aperture angle, and/or as the measured value to a controller 13, which compares the measured value to a setpoint indicated by a setpoint device 18, 19, and transmits an activation signal to the positioning motor 3, whereby there is a manual adjustment apparatus 9 for the off-current adjustment of the shutter adjusting blade 4, which has a rotary disc with several notches on the circumference and connected to the rotary shutter 2, and a locking lever connected to the shutter adjusting blade 4 for the positive connection of the shutter adjusting blade 4 to the rotary shutter 2.

An additional aspect of the invention is an adjustable rotary shutter characterized by the fact that the notches are located at specified angular intervals over the circumference of the rotary disc.

A yet additional aspect of the invention is an adjustable rotary shutter for a moving picture camera with a rotary shutter and a shutter adjusting blade which can be adjusted coaxially to it, and which is connected by means of a transmission to a positioning motor coupled to the shaft of the rotary shutter, with a potentiometer 6 connected on one hand to the shutter adjusting blade 4 and on the other hand to the rotary shutter 2 which measures the current position of the shutter adjustment blade 4 in relation to the rotary shutter 2, and emits a position signal indicating the current position as a control signal for the activation of a display apparatus 17 indicating the shutter aperture angle, and/or as the measured value to a controller 13, which compares this measured value with a setpoint indicated by a setpoint device 18, 19, and transmits an activation signal to the positioning motor 3, whereby between the rotary shutter 2 and the shutter adjusting blade 4, there is a bearing and friction apparatus 7, 8, which consists of several spheres 81 to 84 at some radial distance from one another, and of several plastic segments 85 to 88 located in the radial direction between the spheres 81 to 84, with several magnets 7 fastened to the shutter adjusting blade 4.

A further additional aspect of the invention is an adjustable rotary shutter for a moving picture camera with a rotary shutter and a shutter adjusting blade which can be adjusted coaxially to it, and which is connected by means of a transmission to a positioning motor coupled to the shaft of the rotary shutter, with a potentiometer 6 connected on one hand to the shutter adjusting blade 4 and on the other hand to the rotary shutter 2 which measures the current position of the shutter adjustment blade 4 in relation to the rotary shutter 2, and emits a position signal indicating the current position as a control signal for the activation of a display apparatus 17 indicating the shutter aperture angle, and-/or as the measured value to a controller 13, which compares this measured value with a setpoint indicated by a setpoint device 18, 19, and transmits an activation signal to the positioning motor 3, whereby the rotary shutter shaft 1 is connected by means of a transmission to the main motor of the moving picture camera.

A further additional aspect of the invention is an arrangement for the operation of an adjustable rotary shutter for a moving picture camera with a rotary shutter and a shutter adjusting blade which can be adjusted in relation to it and which is connected by means of a transmission to a positioning motor coupled to the shaft of the rotary shutter, characterized by the fact that in the vicinity of the rotary shutter 2, 4 there is a sensor apparatus 20 for the measurement of the shutter aperture angle and is connected to a microprocessor 16, which is connected on the output side via a first amplifier 11 to two slip ring contacts connected to the positioning motor 3, and on the input side by means of a second amplifier 12 to three slip ring contacts connected to the wiper strip 62 of the potentiometer 6, as well as to a setpoint device 18, 19.

A yet further additional aspect of the invention is an arrangement characterized by the fact that the microprocessor 16 is connected by means of a digital/analog converter 14 and a PID controller 13 to the first amplifier 11, and via an analog/digital converter 15 to an analog operating apparatus 18, and to the output of the second amplifier 12, that an additional input of the microprocessor 167 is connected to a programmer unit 19, that the connection of the analog/digital converter 15 is connected to the output of the second amplifier 12 to the PID controller 13, and that an output of the microprocessor 16 is connected to the display apparatus 17.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. A moving picture camera with an adjustable rotary shutter, said camera comprising:
    a camera body;
    a lens;
    a rotary shutter on a shaft;
    a shutter adjusting blade, said shutter adjusting blade being adjustable coaxially to said rotary shutter for adjusting a shutter aperture angle;
    a transmission and a positioning motor, said adjusting blade being connected by said transmission with said positioning motor coupled to said shaft of said rotary shutter;

a potentiometer being connected to said shutter adjusting blade and to said rotary shutter, said potentiometer for measuring the actual position of said shutter adjustment blade in relation to said rotary shutter, and said potentiometer for generating a position signal indicating the actual position;

a setpoint device for indicating a setpoint of the adjustable rotary shutter;

said position signal being for at least one of:
  a) a control signal for the activation of a display apparatus for indicating the shutter aperture angle, and
  b) a measured value for a controller, said controller for comparing said measured value to said setpoint to generate an error signal, and said controller for transmitting an activation signal derived from said error signal to said positioning motor.

2. The moving picture camera according to claim 1, wherein said potentiometer comprises a wiper strip and a wiper contact, said wiper strip being connected to said shaft of said rotary shutter and said wiper contact being connected to said shutter adjusting blade.

3. The moving picture camera according to claim 1, wherein said rotary shutter shaft comprises slip ring contacts, said slip ring contacts for transmitting power to said positioning motor and for transmitting a resistance value from said potentiometer.

4. The moving picture camera according to claim 1, wherein:
  said positioning motor comprises a shaft;
  said transmission comprises a planetary gearing, said planetary gearing comprises a sun wheel, at least one planet wheel, and a gear rim;
  said sun wheel being connected to said shaft of said positioning motor;
  said at least one planet wheel connecting said sun wheel to said gear rim; and
  said gear rim being coupled to said shutter adjusting blade.

5. The moving picture camera according to claim 1, comprising:
  a manual adjustment apparatus for adjusting of said shutter adjusting blade at least when there is no power;
  said manual adjustment apparatus comprising:
    a rotary disc with a plurality of notches on a circumference of said rotary disc, said rotary disc being connected to said rotary shutter; and
    a locking lever being connected to said shutter adjusting blade, said locking lever for engaging at least one of said plurality of notches for the positive connection of said shutter adjusting blade to said rotary shutter.

6. The moving picture camera according to claim 5, wherein said notches on a circumference of said rotary disc are located at specified angular intervals along said circumference of said rotary disc.

7. The moving picture camera according to claim 1, comprising a bearing and friction apparatus between said rotary shutter and said shutter adjusting blade, said bearing and friction apparatus comprising:
  a plurality of spheres, each of said plurality of spheres being at some radial distance from one another;

a plurality of plastic segments, each of said plurality of segments being located in a radial direction between each of said plurality of spheres; and
  a plurality of magnets fastened to said shutter adjusting blade.

8. The moving picture camera according to claim 1, wherein said shaft of said rotary shutter is connected by means of a main motor transmission to the main motor of the movie picture camera.

9. A moving picture camera with an adjustable rotary shutter, the moving picture camera comprising:
  a camera body;
  a lens;
  a rotary shutter;
  a shutter adjusting blade being adjustable in relation to the rotary shutter, the shutter adjusting blade being connected by means of a transmission to a positioning motor coupled to the shaft of the rotary shutter;
  a first plurality of slip ring contacts being connected to the positioning motor;
  a potentiometer being connected to said shutter adjusting blade and said rotary shutter, said potentiometer comprising a wiper strip, said potentiometer for measuring the actual position of said shutter adjustment blade in relation to said rotary shutter;
  a second plurality of slip ring contacts being connected to said wiper strip of said potentiometer;
  a sensor apparatus being in the vicinity of the rotary shutter, said sensor apparatus for measuring a shutter aperture angle;
  a microprocessor comprising at least one input and at least one output, said microprocessor for being connected to said sensor apparatus;
  a first amplifier and a second amplifier;
  said microprocessor being connected on one of said at least one output via said first amplifier to the first plurality of slip ring contacts;
  said microprocessor being connected on one of said at least one input via said second amplifier to the second plurality of slip ring contacts; and
  a setpoint device being connected to one of said at least one input of said microprocessor, said setpoint device for indicating a setpoint of the adjustable rotary shutter.

10. The moving picture camera of claim 9, comprising:
  a digital/analog converter;
  a proportional-integral-derivative controller;
  said microprocessor being connected on said one of said at least one output side to said digital/analog converter;
  said digital/analog converter being connected to said proportional-integral-derivative controller;
  said proportional-integral-derivative controller being connected to said first amplifier;
  an analog/digital converter;
  said setpoint device comprising an analog operating apparatus and a program unit;
  said microprocessor being connected on said one of said at least one input to said analog/digital converter;
  said analog/digital converter being connected by a connection to the output of said second amplifier;
  said analog/digital converter being connected to said analog operating apparatus;

said microprocessor for being connected on one other of said at least one input side to said programmer unit;

said connection connecting said analog/digital converter to the output of said second amplifier also being connected to said proportional-integral-derivative controller; and a display apparatus being connected to one of said at least one output of said microprocessor.

11. An adjustable rotary shutter for a moving picture camera, comprising:

a rotary shutter on a shaft;

a shutter adjusting blade, said shutter adjusting blade being adjustable coaxially to said rotary shutter for adjusting a shutter aperture angle;

a transmission and a positioning motor, said adjusting blade being connected by said transmission with said positioning motor coupled to said shaft of said rotary shutter;

a potentiometer being connected to said shutter adjusting blade and to said rotary shutter, said potentiometer for measuring the actual position of said shutter adjustment blade in relation to said rotary shutter, and said potentiometer for generating a position signal indicating the actual position;

a setpoint device for indicating a setpoint of the adjustable rotary shutter;

said position signal being for at least one of:
a) a control signal for the activation of a display apparatus for indicating the shutter aperture angle, and
b) a measured value for a controller, said controller for comparing said measured value to said setpoint to generate an error signal, and said controller for transmitting an activation signal derived from said error signal to said positioning motor.

12. The adjustable rotary shutter according to claim 11, wherein said potentiometer comprises a wiper strip and a wiper contact, said wiper strip being connected to said shaft of said rotary shutter and said wiper contact being connected to said shutter adjusting blade.

13. The adjustable rotary shutter according to claim 11, wherein said rotary shutter shaft comprises slip ring contacts, said slip ring contacts for transmitting power to said positioning motor and for transmitting a resistance value from said potentiometer.

14. The adjustable rotary shutter according to claim 11, wherein:

said positioning motor comprises a shaft;

said transmission comprises a planetary gearing, said planetary gearing comprises a sun wheel, at least one planet wheel, and a gear rim;

said sun wheel being connected to said shaft of said positioning motor;

said at least one planet wheel connecting said sun wheel to said gear rim; and said gear rim being coupled to said shutter adjusting blade.

15. The adjustable rotary shutter according to claim 11, comprising a manual adjustment apparatus for adjusting of said shutter adjusting blade at least when there is no power, said manual adjustment apparatus comprising:

a rotary disc with a plurality of notches on a circumference of said rotary disc, said rotary disc being connected to said rotary shutter; and a locking lever being connected to said shutter adjusting blade, said locking lever for engaging at least one of said plurality of notches for the positive connection of said shutter adjusting blade to said rotary shutter.

16. The adjustable rotary shutter according to claim 15, wherein said notches on a circumference of said rotary disc are located at specified angular intervals along said circumference of said rotary disc.

17. The adjustable rotary shutter according to claim 11, comprising a bearing and friction apparatus between said rotary shutter and said shutter adjusting blade, said bearing and friction apparatus comprises:

a plurality of spheres, each of said plurality of spheres being at some radial distance from one another;

a plurality of plastic segments, each of said plurality of segments being located in a radial direction between each of said plurality of spheres; and a plurality of magnets fastened to said shutter adjusting blade.

18. The adjustable rotary shutter according to claim 11, wherein said shaft of said rotary shutter is connected by means of a main motor transmission to the main motor of the movie picture camera.

19. The adjustable rotary shutter according to claim 11, comprising:

a first plurality of slip ring contacts being connected to the positioning motor;

said potentiometer comprising a wiper strip;

a second plurality of slip ring contacts being connected to said wiper strip of said potentiometer;

a sensor apparatus being in the vicinity of the rotary shutter, said sensor apparatus for measuring a shutter aperture angle;

a microprocessor comprising at least one input and at least one output, said microprocessor for being connected to said sensor apparatus;

a first amplifier and a second amplifier;

said microprocessor being connected on one of said at least one output via said first amplifier to the first plurality of slip ring contacts;

said microprocessor being connected on one of said at least one input via said second amplifier to the second plurality of slip ring contacts; and said setpoint device being connected to one of said at least one input of said microprocessor.

20. The adjustable rotary shutter according to claim 19, comprising:

a digital/analog converter;

a proportional-integral-derivative controller;

said microprocessor being connected on said one of said at least one output side to said digital/analog converter;

said digital/analog converter being connected to said proportional-integral-derivative controller;

said proportional-integral-derivative controller being connected to said first amplifier;

an analog/digital converter;

said setpoint device comprising an analog operating apparatus and a program unit;

said microprocessor being connected on said one of said at least one input to said analog/digital converter;

said analog/digital converter being connected by a connection to the output of said second amplifier;

said analog/digital converter being connected to said analog operating apparatus;

said microprocessor for being connected on one other of said at least one input side to said programmer unit;

said connection connecting said analog/digital converter to the output of said second amplifier also being connected to said proportional-integral-derivative controller; and a display apparatus being connected to one of said at least one output of said microprocessor.

* * * * *